(12) United States Patent
Schoenherr et al.

(10) Patent No.: US 10,657,817 B2
(45) Date of Patent: May 19, 2020

(54) AUTOMATED PARKING

(71) Applicant: Robert Bosch GmbH, Stuttgart (DE)

(72) Inventors: Michael Schoenherr, Renningen-Malmsheim (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 185 days.

(21) Appl. No.: 15/355,578

(22) Filed: Nov. 18, 2016

(65) Prior Publication Data
US 2017/0148325 A1 May 25, 2017

(30) Foreign Application Priority Data

Nov. 20, 2015 (DE) .................. 10 2015 222 926

(51) Int. Cl.
| | |
|---|---|
| *G08G 1/14* | (2006.01) |
| *B60W 30/06* | (2006.01) |
| *B62D 15/02* | (2006.01) |
| *G08G 1/0967* | (2006.01) |
| *B60W 40/06* | (2012.01) |

(Continued)

(52) U.S. Cl.
CPC ............ *G08G 1/148* (2013.01); *B60W 30/06* (2013.01); *B60W 40/06* (2013.01); *B60W 40/068* (2013.01); *B60W 40/072* (2013.01); *B60W 40/076* (2013.01); *B62D 15/0285* (2013.01); *G08G 1/096725* (2013.01); *G08G 1/096741* (2013.01); *G08G 1/096775* (2013.01); *G08G 1/146* (2013.01); *B60W 2420/403* (2013.01); *B60W 2420/54* (2013.01); *B60W 2420/62* (2013.01); *B60W 2552/05* (2020.02); *B60W 2552/15* (2020.02); *B60W 2552/20* (2020.02); *B60W 2552/30* (2020.02); *B60W 2556/50* (2020.02); *B60W 2556/55* (2020.02)

(58) Field of Classification Search
None
See application file for complete search history.

(56) References Cited

U.S. PATENT DOCUMENTS

| | | | |
|---|---|---|---|
| 2011/0196568 A1* | 8/2011 | Nickolaou | B60W 30/0953 701/31.4 |
| 2013/0231824 A1 | 5/2013 | Wilson et al. | |

(Continued)

FOREIGN PATENT DOCUMENTS

| | | |
|---|---|---|
| DE | 102011010242 A1 | 8/2011 |
| DE | 102011084124 A1 | 4/2013 |
| EP | 2148220 A1 | 1/2010 |

OTHER PUBLICATIONS

Uniterholzner, Alois: "Sensor Orientation Selection and Adaptive Control of an Actuated Sensor Platform for Autonomous Vehicles", (2015), Dissertation, XP055532031, pp. 1-167.

*Primary Examiner* — Anne Marie Antonucci
(74) *Attorney, Agent, or Firm* — Norton Rose Fulbright US LLP; Gerard Messina

(57) ABSTRACT

A motor vehicle includes a sensor for scanning a surrounding area. A method for controlling the motor vehicle includes steps of ascertaining a driving situation of the motor vehicle, scanning the surrounding area of the motor vehicle with the aid of the sensor, processing the scanned information and controlling the motor vehicle on the basis of the processed information. The scanning and/or processing are/is carried out as a function of the ascertained driving situation.

11 Claims, 3 Drawing Sheets

(51) Int. Cl.
*B60W 40/076* (2012.01)
*B60W 40/072* (2012.01)
*B60W 40/068* (2012.01)

(56) References Cited

U.S. PATENT DOCUMENTS

2014/0324310 A1* 10/2014 Kobayashi ......... B62D 15/0285
　　　　　　　　　　　　　　　　　　　701/70
2014/0347448 A1* 11/2014 Hegemann ................ G06T 7/90
　　　　　　　　　　　　　　　　　　　348/46
2016/0371982 A1* 12/2016 Arndt .................... G08G 1/143

\* cited by examiner

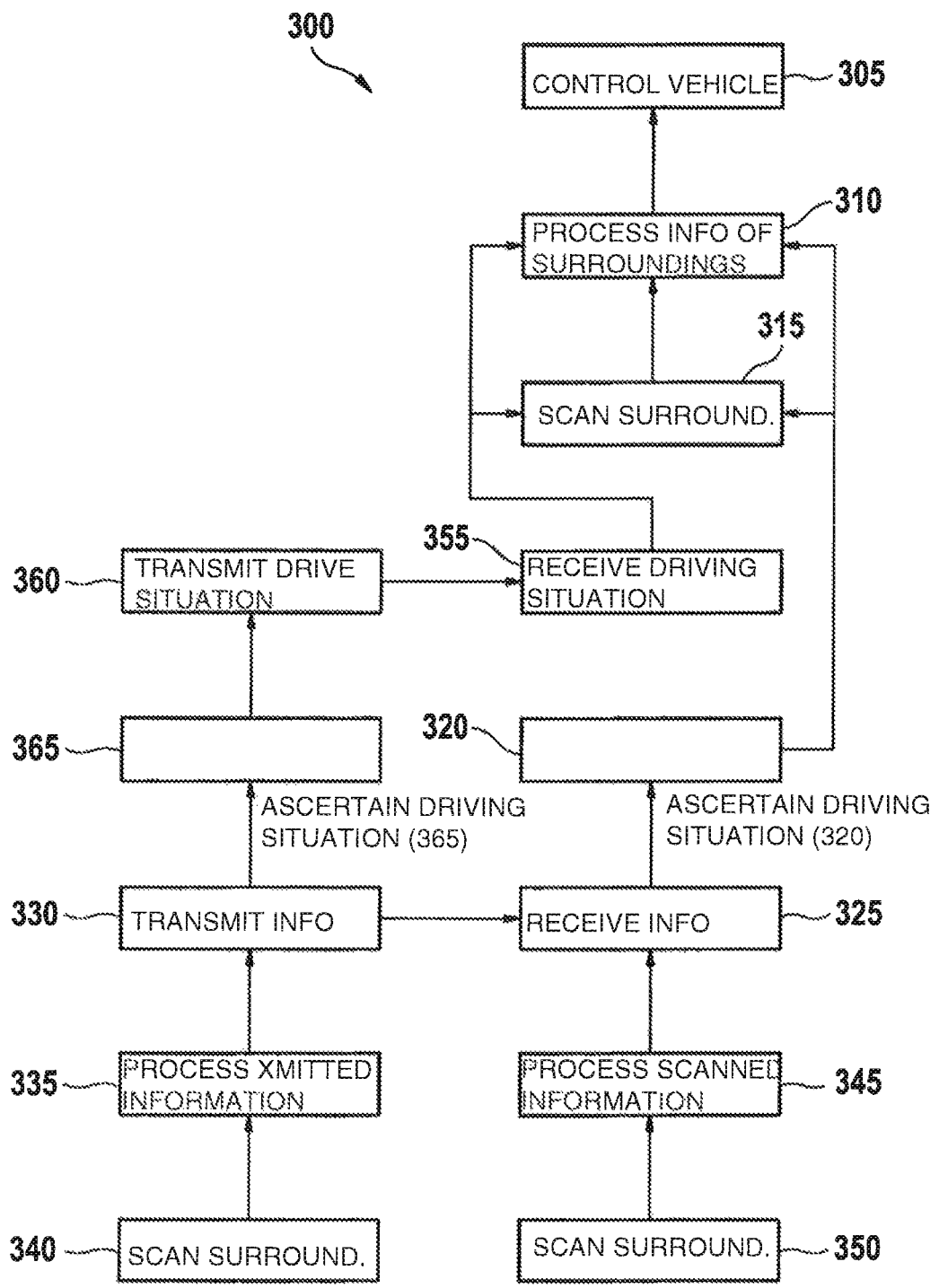

AUTOMATED PARKING

BACKGROUND INFORMATION

A parking system includes a parking lot having a plurality of parking spaces for parking motor vehicles; in the parking system, a motor vehicle can be controlled in an autonomous manner along a route between a hand-over point and one of the parking spaces in the parking lot. Such a process is known as automated valet parking (AVP). If a motor vehicle is to be parked in the parking lot, then it is sufficient if the driver brings the motor vehicle to the hand-over point and leaves it there. The motor vehicle then drives in a highly automated or fully automated manner to one of the parking spaces assigned to it by a management system, for instance. If the motor vehicle is to be picked up again, then it may be controlled in the reverse direction from the parking space to the hand-over point, where the driver gets in and controls the motor vehicle on his own in the known manner outside the parking lot.

In different stages of refinement, the control of the motor vehicle may take place in different ways. In a first variant, the motor vehicle is guided by a parking-lot-side processing system. All tasks required for this purpose, in particular a position determination of the motor vehicle, scanning the surrounding area of the motor vehicle for obstacles, route planning and a response to environmental influences, are performed by a processing system that is installed in the parking lot. This processing system is implemented as an active infrastructure.

In a second variant, tasks such as a situation interpretation, route planning and other decisions are carried out by the motor vehicle. The motor vehicle adopts data from the infrastructure of the parking lot, such as a position map and a target position to be navigated to, and controls its driving in the parking lot on its own. In the event that the infrastructure identifies problems, it transmits these problems and possibly additional suggestions for action to the motor vehicle. For instance, it may be suggested to stop the motor vehicle because a person not yet visible from the direction of the motor vehicle is crossing the scheduled route of the motor vehicle. In case of a critical problem, the infrastructure is also able to intervene in the driving process, for instance by triggering an emergency braking operation. In this variant, the parking-lot-side processing system is embodied as a cooperative infrastructure.

In a third variant, the control of the motor vehicle is carried out completely by the motor vehicle itself. The motor vehicle may adopt required data such as a map of the parking lot or a target position to be heading for from the infrastructure. The navigation of the motor vehicle then essentially takes place as described above with reference to the second variant. No further control or support on the part of the infrastructure is provided in this context. In this variant, the parking-lot-side processing system is set up as a passive infrastructure.

In each one of these variants, the surrounding area of the motor vehicle must be scanned by the motor vehicle as well, at least in a supplementary manner. To do so, the motor vehicle is usually equipped with one or more sensor(s). Such sensors are normally designed for only one special purpose, such as a lateral ultrasonic sensor for parking. However, such specialized sensors are disadvantageous for some driving maneuvers that are executed within the scope of automated valet parking. A usual resort consists of installing multiple specialized sensors in the vehicle. However, such a procedure is complex and may increase the manufacturing costs of the motor vehicle.

SUMMARY

Therefore, the present invention is based on the objective of providing an improved technology for automated parking of a motor vehicle.

A motor vehicle includes a sensor for scanning an environment. A method for controlling the motor vehicle includes steps of ascertaining a driving situation of the motor vehicle, scanning the surrounding area of the motor vehicle with the aid of the sensor, processing the scanned information, and controlling the motor vehicle on the basis of the processed information. The scanning and/or processing take(s) place as a function of the ascertained driving situation.

In an advantageous manner, an only slightly specialized sensor or a non-specialized sensor may thereby be adapted to different driving situations, so that the control of the motor vehicle may be improved as a whole. The use of a plurality of highly specialized sensors is thereby able to be avoided. The situationally adapted interpretation or collection of sensor information may lead to an improved control of the motor vehicle.

In the process, the motor vehicle is preferably controlled in a parking space within the framework of an automated parking process. The motor vehicle is usually guided along a path between a hand-over point and a parking space for the motor vehicle, with both directions being possible. Other routes, for instance, may include parking or leaving a parking space. In each of the three variants for controlling the motor vehicle in the parking lot described at the outset, the sensor information may be used for controlling the motor vehicle and/or for validating control information. The sensor information may be used directly or as redundant information. In particular, it is possible to combine the sensor information with other sensor information collected by a further sensor, the two sensors employing different measuring principles. For example, one of the sensors may include a camera, and the other have an ultrasonic sensor. In different variants of the control of the motor vehicle, the further sensor may be assigned to the motor vehicle or to the parking-lot-side processing system.

In a first variant, the driving situation is ascertained by a parking-lot-side processing system and transmitted to the motor vehicle. In a second variant, a surrounding area of the motor vehicle is scanned with the aid of sensors of a parking-lot-side processing system. The scanned information is transmitted to the motor vehicle and the driving situation is ascertained with the aid of a processing device of the motor vehicle. In a third variant, the motor vehicle includes a plurality of sensors and the driving situation is ascertained autonomously on the part of the motor vehicle.

These three variants structurally correspond to the three variants of the control of the motor vehicle in the parking lot described at the outset.

In one specific embodiment, the scanning and/or processing as a function of the ascertained driving situation includes varying a detection region of the sensor. The sensor may be physically influenced for this purpose, for instance in that a focus or a focal length of an optical system is adapted or an angle of radiation of a scanning signal is varied. In another specific embodiment, it is also possible to vary the detection region within the processing scope. For instance, only a specific section of a camera image, which is selected as a function of the driving situation, may be analyzed. In the case of a permanently forward-facing camera, for example, an upper image section may be selected when the motor vehicle approaches the lower end of a ramp. Accordingly, a lower image section may be selected when the motor vehicle is located on the ramp and approaches the upper end.

In a still other specific embodiment, the scanning and/or processing as a function of the ascertained driving situation may include a use of a threshold value selected on the basis of the driving situation. In this way it is possible to use other respective threshold values for the different driving situations in the processing of the sensor information. For example, a threshold value for a reference brightness of a camera image may be adapted, so that the analysis of the image produces other results.

In a further specific embodiment, the scanning and/or processing as a function of the ascertained driving information includes a selective detection of a predefined object on the basis of the sensor information. For example, if it is known on the basis of the driving situation that a pedestrian has to be expected in the traffic lane, then the sensor information may selectively be processed in such a way that a potential person is detected. To do so, for example, a threshold value for the size of an object to be detected is able to be adapted as a function of the ascertained driving information. To search for a person, for instance in a camera image, a height and a width region of an object to be detected can be restricted to measurements that could correspond to a person.

In one further specific embodiment, the position of the motor vehicle in the parking lot is ascertained and the driving situation is determined on the basis of the ascertained position. In another specific embodiment, for instance, it is possible to ascertain the driving situation via algorithms, in particular on the basis of driving parameters such as a linear or lateral acceleration, a distance to the destination or to a maneuver lying ahead or to an upcoming topographical obstacle such as a threshold, a ramp or a pedestrian crossing.

In a still further specific embodiment, the scanning and/or the processing take(s) place as a function of a state of the ground. The ground is the particular surface on which the motor vehicle is standing or across which the motor vehicle is traveling. The state of the ground may include a roughness, such as a smooth ground (e.g., cement or floor pavement), rough asphalt, pebbles or crushed rock). The state may also include a structure or an obstacle on the ground such as an indentation, a threshold, an edge, a step, a rain gutter or a bulge.

In particular, the driving situation may encompass one of: start of driving, straight-ahead driving, cornering, parking, leaving a parking space, driving on a straight ramp, driving on a ramp featuring a curve, turning and stopping.

A computer program product includes program code means for executing the described method when the computer program product is running on a processing device or is stored on a computer-readable data carrier.

A device for controlling a motor vehicle includes an interface to a control device for controlling the motor vehicle, a sensor for scanning a surrounding area of the motor vehicle, and a processing device for processing the scanned information and for actuating the control device on the basis of the processed information. The scanning of the sensor and/or the processing take(s) place as a function of an ascertained driving situation of the motor vehicle.

As previously described already, the driving situation may be realized on the part of the motor vehicle, on the part of an infrastructure of a parking lot or in cooperation between the infrastructure and the motor vehicle or the described device.

BRIEF DESCRIPTION OF THE DRAWINGS

FIG. 3 shows a flow diagram of a method for controlling the motor vehicle from FIG. 2 in the parking lot from FIG. 1.

DETAILED DESCRIPTION

Figure 1:
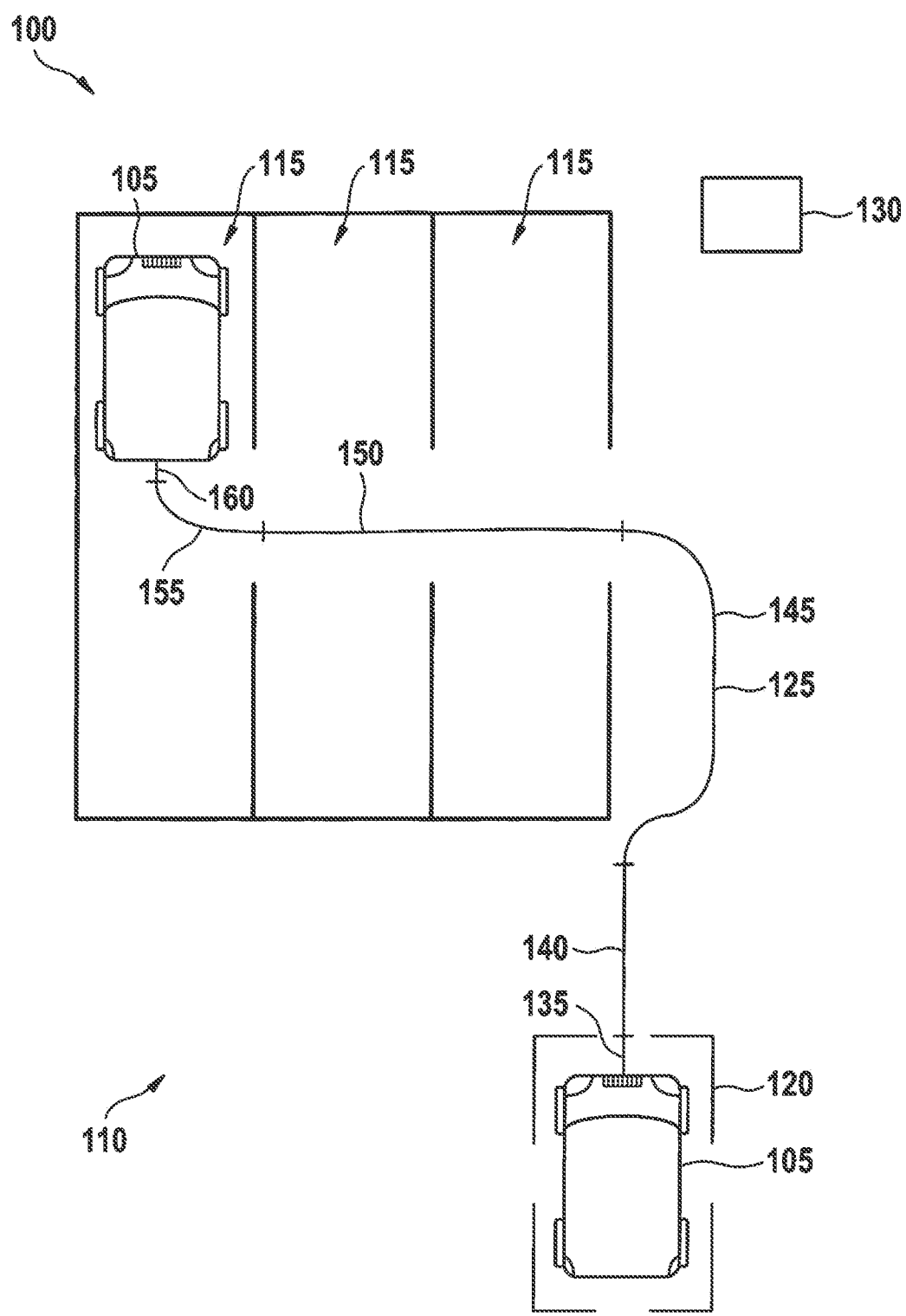
FIG. 1 shows a system for parking a motor vehicle.

FIG. 1 shows a system 100 for parking a motor vehicle 105. System 100 is made up of motor vehicle 105 and a parking lot 110 which has at least one parking space 115 for parking a motor vehicle 105, and a hand-over point 120. Motor vehicle 105 is able to be brought to hand-over point 120 by a driver and left there. Then, motor vehicle 105 is autonomously guided to an unoccupied parking space 115 along a route 125. Route 125 may be traveled in any direction and may optionally include a process of parking and/or leaving a parking space and/or start of driving or a stopping process. The control can be controlled to a decisive extent by an infrastructure 130 which is allocated to parking space 110, by motor vehicle 105 itself or in cooperation between infrastructure 130 and motor vehicle 105. If the driver of motor vehicle 105 wishes to collect motor vehicle 105 again, then route 125 may be autonomously driven in a corresponding manner in the reverse direction.

Route 125 is subdivided into different sections, in which different driving situations are at hand. Sketched purely by way of example are a first section 135 in which motor vehicle 105 starts driving at hand-over point 120, a second section 140 in which motor vehicle 105 is driving straight ahead, a third section 145 in which motor vehicle 105 is driving through a curve, a fourth section 150 in which motor vehicle 105 is driving straight ahead again, a fifth section 155 in which motor vehicle 105 is parking in a parking space 115, and a sixth section 160, in which motor vehicle 105 is stopped or parked. A respective driving situation is assigned to each mentioned section. Other or additional driving situations are possible as well, such as driving on a straight or curved ramp, a transition between driving on a level surface and ramp driving, or crossing an obstacle such as a bump in the road or a pedestrian crossing. In the ramp driving, it may be distinguished between uphill and downhill driving.

Regardless of whether motor vehicle 105 is controlled autonomously on route 125 with the aid of an on-board system or an off-board system, at least one sensor on board motor vehicle 105 must be used to scan a surrounding area in order to control or safeguard the travel of motor vehicle 105 on route 125.

Figure 2:
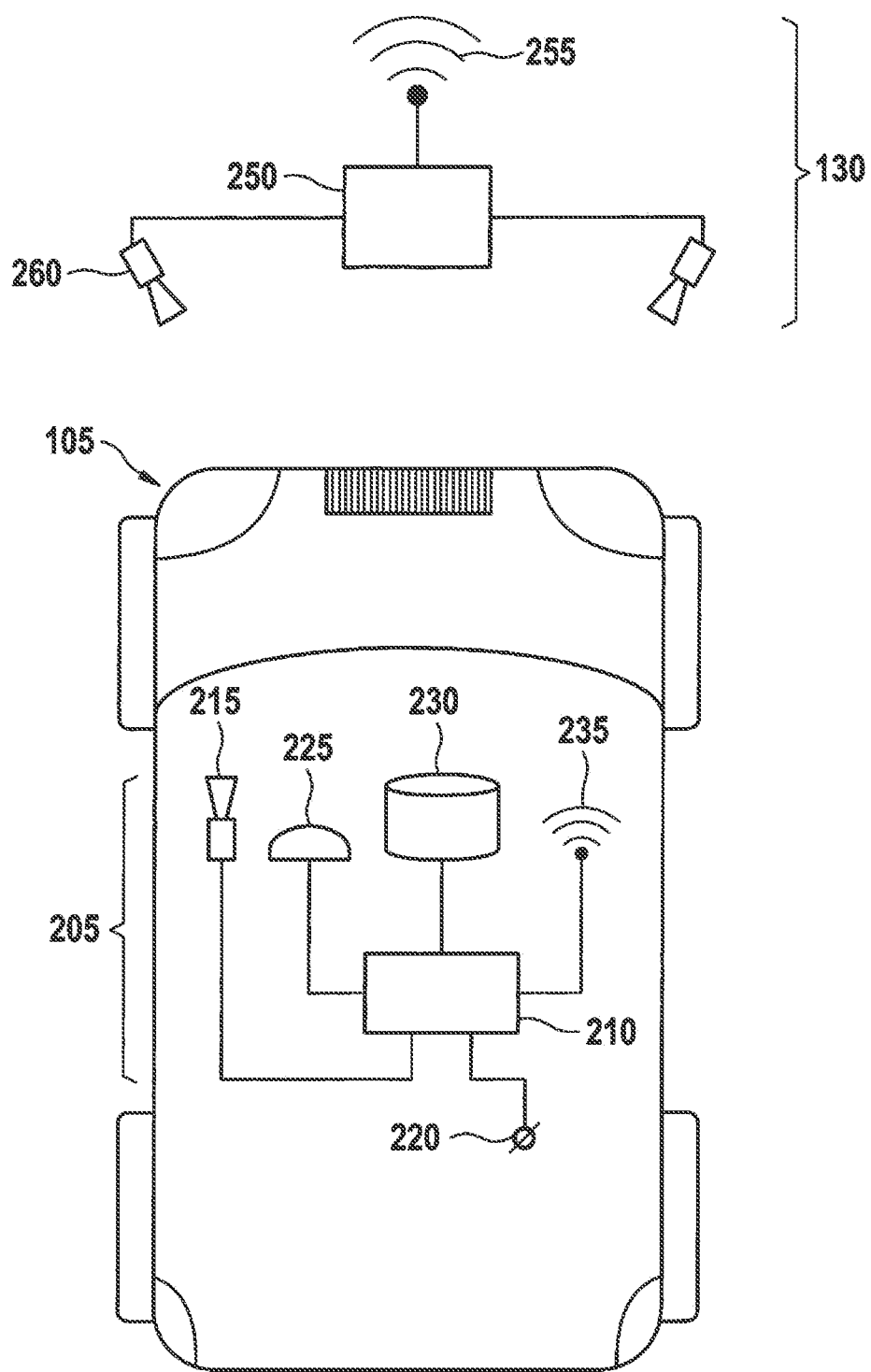
FIG. 2 shows a motor vehicle for the system from FIG. 1.

FIG. 2 shows a motor vehicle 105 for system 100 from FIG. 1. Also shown is an exemplary portion of infrastructure 130 of parking lot 110.

Mounted on board motor vehicle 105 is a device 205 which encompasses a processing device 210, a sensor 215, and an interface 220. Sensor 215 is set up for scanning a surrounding area of motor vehicle 105 and, for instance, may include a camera or an ultrasonic sensor. Of course it is also possible to provide a plurality of sensors 215, which may be based on the same measuring principle or on different measuring principles. The sensor data of sensors 215 may be merged with one another. Interface 220 is designed to exchange information with a control device for motor vehicle 105 in order to influence a linear or lateral acceleration of motor vehicle 105. In addition, device 205 may include a positioning device 225 for ascertaining a position of motor vehicle 105 in parking lot 110 and possibly a map memory 230 including map information of a surrounding area of motor vehicle 105. In addition, it is preferred that a communications device 235 is provided for the wireless communication with infrastructure 130 of parking space 110.

In the specific embodiment shown by way of example, infrastructure 130 includes a further processing device 250, a wireless communications device 255 for the communication with device 205, and at least one sensor 260 for scanning motor vehicle 105 or a surrounding area, in particular along route 125.

In the known manner, motor vehicle 105 is controlled on route 125 by scanning its surrounding area and adapting its linear and lateral accelerations as a function of the processing. Portions of this processing are able to be determined by infrastructure 130 and other parts by device 205. In either case, the surrounding area of motor vehicle 105 is scanned with the aid of on-board sensor 215 and the scanned information is processed in order to assist in the control of motor vehicle 105.

It is proposed to carry out the scanning and/or processing of the sensor information from sensor 215 as a function of a driving situation such as described earlier by way of example with reference to sections 135 through 160 of route 125. The ascertaining of the driving situation may alternatively be carried out by infrastructure 130, by device 205 or cooperatively by both devices. In another specific embodiment, the driving situation may also be ascertained as a function of the position of motor vehicle 105. To do say, a map of parking lot 110 may be provided in which associated driving situations are stored as a function of positions or areas. Instead of storing driving situations, direct storing of corresponding settings for the executing application is possible as well.

FIG. 3 shows a flow diagram of a method 300 for controlling motor vehicle 105 in parking lot 110 of FIG. 1. Steps that may be attributed to infrastructure 130 are shown in a left region, while steps that are executed on board motor vehicle 105 and by device 205, in particular, are shown in a right region. In order to describe the present invention as best as possible, the illustrated method assumes a result, i.e. the control of motor vehicle 105 in a step 305, and the different ways of ascertaining intermediate results are explained beginning with this result and going in reverse.

In order to control the motor vehicle in step 305, information pertaining especially to a surrounding area of motor vehicle 105 is processed in a step 310. This information is scanned from the surrounding area of motor vehicle 105 with the aid of sensor 215 in a step 315.

The processing of the information in step 310 and/or scanning of the surrounding area in step 315 take(s) place as a function of a previously ascertained driving situation. The driving situation is able to be ascertained in different ways. In one specific embodiment, the driving situation is ascertained in a step 320 by device 205 on board motor vehicle 105. Sensor information from the surrounding area of motor vehicle 105, topographical information about a position of motor vehicle 105 or of route 125 and possibly of obstacles in the region of route 125, or dynamic information of motor vehicle 105, especially a linear or lateral speed or a linear or lateral acceleration are used for this purpose, in particular.

Exemplary driving states are explained in greater detail above with reference to FIG. 1.

The driving situation can be determined on the basis of information that is received in a step 325 with the aid of communications device 235. Prior to this, infrastructure 130 transmits this information by means of communications device 255 in a step 330. The transmitted information may have been processed earlier in a step 335, especially on the basis of information that was scanned from the surrounding area of motor vehicle 105 in a step 340 with the aid of one of sensors 260.

If no information from infrastructure 130 is to be used, then the driving situation in step 320 by device 205 may also take place on the basis of information that was processed in a step 345 based on sensor information scanned from the surrounding area of motor vehicle 105 in a preceding step 350.

Still other procedures are conceivable as well. For instance, in addition or as an alternative to ascertaining the driving situation in step 320, the driving situation may also be received in a step 355 and made available in steps 310 and 315. To do so, the driving situation may be transmitted by infrastructure 130 in a step 360. Prior to that, the driving situation is ascertained by infrastructure 130 in a step 365, in particular on the basis of processing results from step 335.

In a further specific embodiment, the ascertaining of the driving situation by infrastructure 130 in step 365 may also take place on the basis of unprocessed or processed information that was scanned or ascertained by device 205. This specific embodiment has not been explicitly sketched in FIG. 3.

What is claimed is:

1. A method for controlling and parking in a parking space of a parking lot a motor vehicle having a sensor for scanning a surrounding area of the motor vehicle, the method comprising:
   ascertaining a driving situation of the motor vehicle;
   scanning the surrounding area with the sensor, which is on-board the vehicle, to produce scanned information;
   processing the scanned information; and controlling and parking in the parking space of the parking lot the motor vehicle based on the processed information, wherein at least one of the scanning and the processing takes place as a function of the ascertained driving situation;
   wherein a driver of the vehicle leaves the vehicle at a hand-over-point in the parking lot, and wherein the vehicle is autonomously guided on a route having different driving sections to the parking space and parking the vehicle in the parking space,
   wherein the motor vehicle is controlled in the parking lot within a framework of an automated parking process,
   wherein at least one of the scanning and the processing takes place as a function of a state of the ground,
   wherein the ground is a surface on which the motor vehicle is standing or across which the motor vehicle is traveling, and wherein the state of the ground includes at least one of a roughness of a cement pavement or other floor pavement, a rough asphalt, pebbles or crushed rock, and/or a structure or an obstacle on the ground, including at least one of an indentation, a threshold, an edge, a step, a rain gutter or a bulge,
   wherein the parking lot includes an infrastructure, which includes a further processing device, a wireless communications device to communicate with a communications device of the motor vehicle, and at least one further sensor for scanning the motor vehicle or a surrounding area, including at least a portion of the route traveled by the vehicle to the parking space,
wherein the ascertaining includes ascertaining a position of the motor vehicle in the parking lot, wherein the driving situation is ascertained based on the ascertained position, and
wherein the ascertained driving situation is determined based on the ascertained position and based on driving parameters, including a distance to a topographical obstacle, including at least one of the threshold, a ramp and/or a pedestrian crossing in the parking lot.

2. The method as recited in claim 1, wherein the driving situation is ascertained by a parking-lot-side processing system and transmitted to the motor vehicle.

3. The method as recited in claim 1, wherein:
the surrounding area of the motor vehicle is scanned with the aid of sensors of a parking- lot-side processing system,
the scanned information is transmitted to the motor vehicle, and
the driving situation is ascertained by a processing device of the motor vehicle.

4. The method as recited in claim 1, wherein the motor vehicle includes a plurality of sensors, and wherein the driving situation is ascertained autonomously on the part of the motor vehicle.

5. The method as recited in claim 1, wherein at least one of the scanning and the processing as a function of the ascertained driving situation includes a variation of a detection region of the sensor.

6. The method as recited in claim 1, wherein at least one of the scanning and the processing as a function of the ascertained driving situation includes a use of a threshold value selected on the basis of the driving situation.

7. The method as recited in claim 1, wherein at least one of the scanning and the processing as a function of the ascertained driving information includes selectively detecting a predefined object on the basis of sensor information.

8. The method as recited in claim 7, further comprising:
adapting a threshold value for a size of the object to be detected as a function of the ascertained driving situation.

9. The method as recited in claim 1, wherein the driving situation includes one of: starting to drive, straight-ahead driving, cornering, parking, leaving a parking space, driving on a straight ramp, driving on a ramp featuring a curve, turning, and stopping.

10. A non-transitory computer readable medium having a computer program, which is executable by a processor, comprising:
a program code arrangement having a program code for controlling and parking in a parking space of a parking lot a motor vehicle having a sensor for scanning a surrounding area of the motor vehicle, by performing the following:
ascertaining a driving situation of the motor vehicle;
scanning the surrounding area with the sensor, which is on-board the vehicle, to produce scanned information;
processing the scanned information; and
controlling the motor vehicle based on the processed information; wherein at least one of the scanning and the processing takes place as a function of the ascertained driving situation, and wherein a driver of the vehicle leaves the vehicle at a hand-over-point in the parking lot, and wherein the vehicle is autonomously guided on a route having different driving sections to the parking space and parking the vehicle in the parking space,
wherein the motor vehicle is controlled in the parking lot within a framework of an automated parking process,
wherein at least one of the scanning and the processing takes place as a function of a state of the ground,
wherein the ground is a surface on which the motor vehicle is standing or across which the motor vehicle is traveling, and wherein the state of the ground includes at least one of a roughness of a cement pavement or other floor pavement, a rough asphalt, pebbles or crushed rock, and/or a structure or an obstacle on the ground, including at least one of an indentation, a threshold, an edge, a step, a rain gutter or a bulge,
wherein the parking lot includes an infrastructure, which includes a further processing device, a wireless communications device to communicate with a communications device of the motor vehicle, and at least one further sensor for scanning the motor vehicle or a surrounding area, including at least a portion of the route traveled by the vehicle to the parking space,
wherein the ascertaining includes ascertaining a position of the motor vehicle in the parking lot, wherein the driving situation is ascertained based on the ascertained position, and
wherein the ascertained driving situation is determined based on the ascertained position and based on driving parameters, including a distance to a topographical obstacle, including at least one of the threshold, a ramp and/or a pedestrian crossing in the parking lot.

11. A device for controlling and parking in in a parking space of a parking lot a motor vehicle, comprising:
an interface to a control device for controlling the motor vehicle;
a sensor, which is on-board the vehicle, for scanning a surrounding area of the motor vehicle to produce scanned information; and
a processing device for processing the scanned information and for actuating the control device on the basis of the processed information, wherein at least one of the scanning of the sensor and the processing taking place as a function of an ascertained driving situation of the motor vehicle; wherein
a driver of the vehicle leaves the vehicle at a hand-over-point in the parking lot, and wherein the vehicle is autonomously guided on a route having different driving sections to the parking space and parking the vehicle in the parking space,
wherein the motor vehicle is controlled in the parking lot within a framework of an automated parking process, and
wherein at least one of the scanning and the processing takes place as a function of a state of the ground,
wherein the ground is a surface on which the motor vehicle is standing or across which the motor vehicle is traveling, and wherein the state of the ground includes at least one of a roughness of a cement pavement or other floor pavement, a rough asphalt, pebbles or crushed rock, and/or a structure or an obstacle on the ground, including at least one of an indentation, a threshold, an edge, a step, a rain gutter or a bulge, wherein the parking lot includes an infrastructure, which includes a further processing device, a wireless communications device to communicate with a communications device of the motor vehicle, and at least one further sensor for scanning the motor vehicle or a surrounding area, including at least a portion of the route traveled by the vehicle to the parking space, wherein the ascertaining includes ascertaining a position of the motor vehicle in the parking lot, wherein the driving situation is ascertained based on the ascertained position, and wherein the ascertained driving situation is determined based on the ascertained position and based on driving parameters, including a distance to a topographical obstacle, including at least one of the threshold, a ramp and/or a pedestrian crossing in the parking lot.

* * * * *